Figure 1:
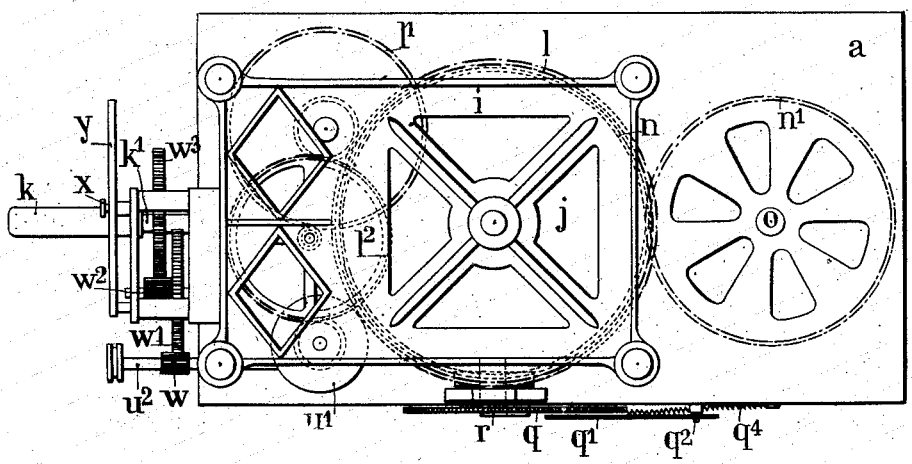

A. B. BARON & C. M. A. GUINARD.
AUTOMATIC APPARATUS FOR AERIAL PHOTOGRAPHY.
APPLICATION FILED DEC. 3, 1912.

1,212,884.

Patented Jan. 16, 1917.
3 SHEETS—SHEET 1.

WITNESSES

INVENTORS
Auguste Blaise Baron,
Charles Marie A. Guinard,
BY Munn & Co.
ATTORNEYS INVENTORS
Auguste Blaise Baron,
Charles Marie A. Guinard,

UNITED STATES PATENT OFFICE.

AUGUSTE BLAISE BARON AND CHARLES MARIE ARTHUR GUINARD, OF PARIS, FRANCE.

AUTOMATIC APPARATUS FOR AERIAL PHOTOGRAPHY.

1,212,884.      Specification of Letters Patent.      Patented Jan. 16, 1917.

Application filed December 3, 1912. Serial No. 734,674.

*To all whom it may concern:*

Be it known that we, AUGUSTE BLAISE BARON, of 155 Boulevard de Magenta, engineer, and CHARLES MARIE ARTHUR GUINARD, of 8 Avenue de l'Opéra, armorer, both in the city of Paris, Republic of France, have invented an Automatic Apparatus for Aerial Photography, of which the following is a full, clear, and exact description.

The invention has for its object an apparatus adapted to be secured under the car of a dirigible balloon, or the frame of an aeroplane, and allowing the automatic photographic recording, on an endless film unwound in an intermittent manner, of all grounds overflown by any aerial machine whatever; the successive images thus obtained may serve either for military reconnoiterings or for making out topographic cards, or for any other use. The pellicular images can also serve for knowing the altitude at which they have been registered, as well as the real speed of the flying machine carrying the apparatus. In fact, the exact optical angle of the objective used being known, as well as the surface covered by this objective at a determined altitude, it will be easy to find the latter by measuring the ground embraced by the images with a card of the region traveled over. Moreover, knowing the speed at which is unwound the film which is driven by a clock work motor provided with an indicating brake, it will also be very easy to know the distance traveled by the objective during a given time and, consequently, to determine the exact speed of the flying machine relatively to the ground, a result which actually cannot be obtained by any measuring apparatus.

The present apparatus is essentially characterized by the combination: of an optical dark camera inclosed in a box,—of a motor automatically insuring the unwinding of the film,—and of a shutter controlled by the motor so as to be released at the precise moment when the film stops in front of the objective.

The pellicular band, drawn by an operating device working in an intermittent manner, moves in a slide in which it stops at the focus of the objective at the required moment for the exposure.

The driving roller is directly actuated by the driving device by means of suitably toothed pinions, one of which is arranged, so as to gear on a part of its periphery only and to turn freely during the remainder of its revolution, thus alternately drawing or leaving at rest the winding cylinder of the film.

The various parts of the apparatus are so calculated that the speed with which the film unwinds and the stopping of the same should bear a relation to the speed of the vehicle carrying the said apparatus, so that the images obtained on the pellicular band slightly overlap each other in order that there may be no break of continuity in the taking of the panoramic view of the aerial travel. A brake, adjustable at will, allows of moderating or accelerating the speed of the motor according to the speed of the flying machine.

Figure 2:
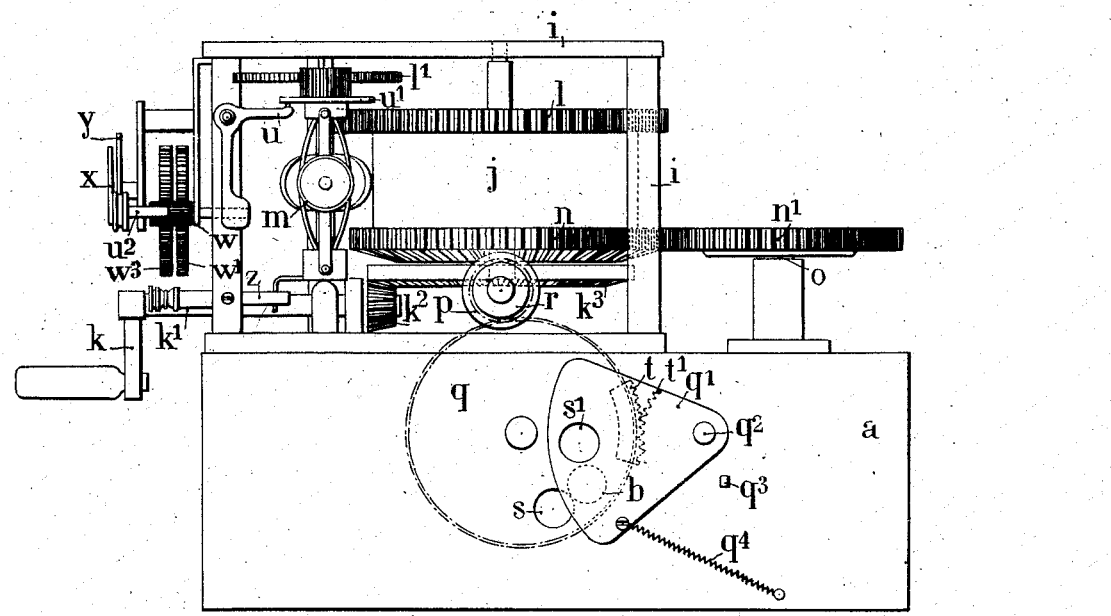
Figure 3:
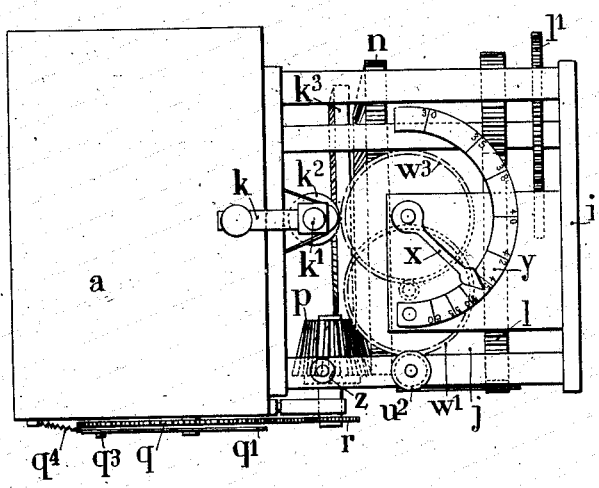
Figure 6:
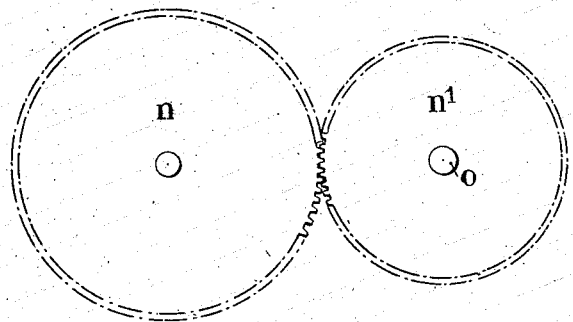
Figure 4:
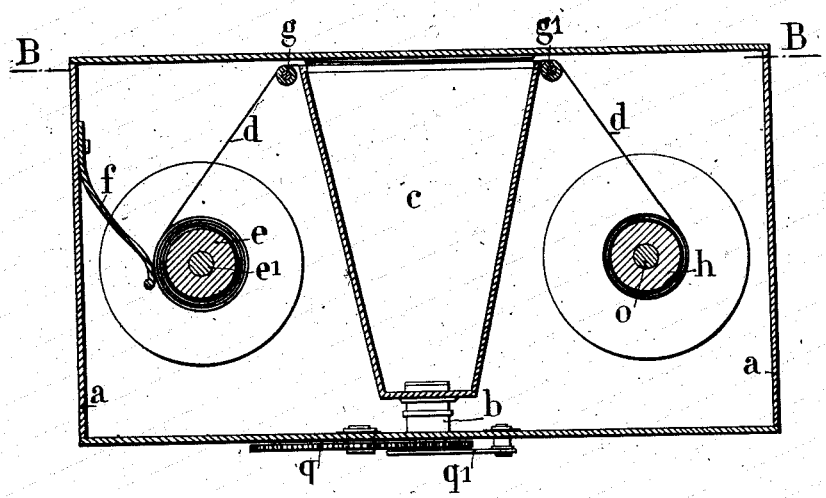
Figure 5:
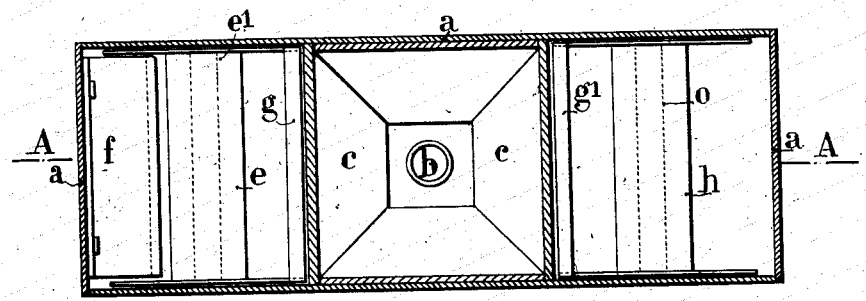

The invention is illustrated by way of example in the accompanying drawings, in which:

Figure 1 shows in elevation a photographic apparatus arranged according to the principle of the invention; Fig. 2 is a bottom view; Fig. 3 is an end view showing in detail the speed regulator; Fig. 4 is a vertical section made according to line A—A of Fig. 5; Fig. 5 is a horizontal section made according to line B—B of Fig. 4; Fig. 6 is a detail view of the intermittent operating device for the film.

As illustrated in the drawings, the present photographic apparatus comprises a rectangular box $a$ (Figs. 1, 2, 3, 4, 5), called "magazine-box," in the lower face of which is provided an opening situated opposite the objective $b$. The interior of the rectangular box $a$ is divided by walls forming at the center a dark camera $c$ (Figs. 4 and 5) and laterally to the latter two compartments adapted to receive the unwinding and winding mechanism of the sensitive pellicular band $d$. This band is wound on a cylinder $e$ rotating freely about a fixed axis $e^1$. A pressure spring $f$, constantly rubbing over the film roll, controls the unwinding of the same. When the film $d$ is unwound from the cylinder $e$, it passes on a small guide roller $g$ and through a slide formed by the ends of the dark camera $c$ and the upper face of the box $a$. Issuing from the slide the film $d$ passes over a second guide roller $g^1$ and to an operating cylinder $h$ where its intermittent winding is obtained by means of the devices described hereafter.

The motor adapted to draw the film is composed of a frame $i$ (Figs. 1, 2, 3) carrying a barrel $j$ containing a spring which is wound up by means of a crank $k$ and of a shaft $k^1$ supporting a conical pinion $k^2$ gearing with a toothed wheel $k^3$ rigidly mounted on the axis of the barrel. The latter is provided at its upper end with a toothed wheel $l$ actuating, by means of intermediary wheels $l^1$ $l^2$, a ball regulator $m$. At the lower end of the barrel $j$ is secured a toothed wheel $n$ gearing with another toothed wheel $n^1$ secured on a shaft $o$ on which fits the winding cylinder $h$. The wheel $n$ is toothed on ⅘ of its periphery and is toothed on its underside so as to gear with a conical pinion $p$ actuating the device of the shutter. The wheel $n^1$ the periphery of which corresponds to the ⅘ of that of the wheel $n$ is toothed on its entire periphery. The rotary movement of the wheel $n$ integral with the barrel $j$ and rotating therewith, is therefore transmitted to the wheel $n^1$ so long as the teeth on its periphery are in gear with those of said wheel $n^1$. As soon as the smooth part of the wheel $n$ passes opposite the teeth of the wheel $n^1$, as the latter is not actuated it remains stationary and ceases to draw and wind up the film on the cylinder $h$. This stopping movement corresponds to the opening of the shutter of the objective. This shutter is composed of a disk $q$ (Fig. 1), toothed on its periphery, and of a blind $q^1$ moving at will in front of said disk. The disk $q$ receives a continuous rotary motion from a pinion $r$ gearing with the teeth of the disk and mounted on the same shaft as the wheel $p$ actuated by the barrel $j$. The disk $q$ as well as the blind $q^1$ is provided with an opening $s$ or $s^1$ having the same diameter as the lens of the objective. The blind $q^1$ pivoting about an axis $q^2$ is when released brought back against a stop $q^3$ under the action of a returning spring $q^4$. The disk $q$ and the blind $q^1$ support on the oppositely arranged faces two toothed sectors $t$ and $t^1$ capable of gearing the one with the other according to the position of the disk $q$.

The shutter operates automatically in the following manner: The disk $q$ constantly actuated by the pinion $r$ rotates about its axis. As long as the toothed sector $t$ supported on the outer face of the disk does not gear with the corresponding toothed sector $t^1$ carried by the inner face of the blind $q^1$, the latter is held stationary against the stop $q^3$ by the spring $q^4$. The disk $q$ continuing its rotary movement, the teeth of the sectors $t$ and $t^1$ gear together, the disk $q$ drives along with it the blind $q^1$ rotating about its axis and causes it to pivot until the two sectors $t$ and $t^1$ cease to gear together; the blind $q^1$ is then suddenly brought back to its stopping position by the action of the returning spring $q^4$. The moment at which the blind $q^1$ ceases to be actuated by the disk $q$ and at which it suddenly escapes is calculated for mathematically corresponding to the moment the opening $s$ of the disk $q$ is exactly opposite the objective $b$. The opening $s^1$ in the blind $q^1$ is so situated that there is always a solid part of the latter covering the objective until the precise moment of its releasing when the opening $s$ of the disk $q$ registers with the objective. As it possesses also a solid part above the opening $s^1$, it follows therefrom that whatever may be the position of the disk $q$ and of the blind $q^1$, the objective is uncovered only by the releasing of the blind $q^1$ and the passage of its opening $s^1$ in front of it.

The differences in the speed with which the sensitive film $d$ is wound on the cylinder $h$ are obtained by means of an adjustable brake $u$ acting by friction on a plate $u^1$ integral with the regulator $m$. This brake presses more or less on the plate $u^1$ under the action of a screw $u^2$ which by its advance causes it to rock more or less about its pivotal axis. This screw $u^2$ actuates, by means of speed reducing pinions and wheels $w$, $w^1$, $w^2$, $w^3$ (Fig. 3) an index $x$ movable on a graduated sector $y$ and the position of which on this sector indicates the speed of the motor. Therefore it suffices to turn the screw $u^2$ until the needle $x$ is brought opposite the desired number, in order that this position corresponds to a slowing down or to an acceleration of working of the operating barrel and, consequently, of the intermittent winding of the film $d$ on the cylinder $h$.

A stop rod $z$ allows of putting the entire driving system in operation or of stopping it at will. For putting the apparatus in operation, it suffices therefore to place on the cylinder $e$ a film roll of any desired length, to cause this film to pass on the guide $g$, to engage it in the slide arranged at the end of the dark camera, after causing it to pass behind the second guide $g^1$, and to bring it on the winding cylinder $h$ by winding it thereon two or three turns for tightening it and preventing it from escaping.

The stop rod $z$ of the motor will be disengaged only at the moment of beginning the photography. The apparatus thus arranged is suspended under the flying machine in any suitable manner and obviously there will be employed a suitable windbreaker for preventing all rocking movements.

The objective $b$ has a fixed focus, set on the infinite and having a minimum optical angle of 70°. The operating roller $h$ has a diameter so calculated that each stopping period corresponds to a winding of the film on an extent having the length of the size of the optical chamber. The diameter of the operating roller increasing in a continuous manner by reason of the thickness of the film wound, the images will be more and more spaced apart, without this spacing apart having any effect on the clearness and size of the image.

The ratios between the wheels $n$ and $n^1$ are so calculated that the part of the wheel $n$ gearing with the wheel $n^1$ corresponds to a full revolution of the latter. In these conditions, the optical angle of 70° giving 560 meters of photographed ground on an image of 9 cm.x9 cm. at the altitude of 400 meters, if the flying machine moves with a speed of 60 kilometers per hour, that is to say 1 kilometer per minute, it will suffice to place the index $x$ of the indicator of the regulator on number 30 which indicates that the barrel effects a full revolution in 30 seconds. Consequently, the apparatus traveling 500 meters in 30 seconds and the image obtained registering 560 meters, each successive image taken in these conditions will encroach 60 meters on the adjacent images, thus giving a succession of images showing, without break of continuity, all the ground overflown by the flying machine, each image representing a travel in the space of half a kilometer; a travel of 40 kilometers will therefore represent 80 successive images of 9 centimeters, that is to say a pellicular band of 7 m. 20.

If the running of the flying machine should slow down or accelerate, or should the altitude vary, it would suffice to move the index of the indicator according to a diagram easy to establish, in order to obtain always a correlation between the running of said machine and the speed of the intermittent winding of the film.

The arrangements indicated above are given by way of example, the forms, sizes and detail devices may vary according to circumstances without modifying the principle of the invention.

Claims:

1. A panoramic photographic apparatus for recording on a film, grounds overflown by an aerial machine, comprising a box having an opening in its bottom and inclosing a dark camera, an objective at the base of said dark camera opposite the opening of the box, a variable speed motor adjustable at will for the automatic intermittent unwinding of the film, and a shutter for the objective, actuated by the motor at the moment of the stopping of the film.

2. A panoramic photographic apparatus for recording on a film, grounds overflown by an aerial machine, comprising a box having an opening in its bottom and inclosing a dark camera, an objective at the base of said dark camera opposite the opening of the box, a variable speed motor adjustable at will, wheels for the transmission of movement, a ball regulator, a movable rod for stopping the motor, and a shutter for the objective.

3. A panoramic photographic apparatus for recording on an endless film, grounds overflown by an aerial machine, comprising a box inclosing a dark camera, an objective at the base of said dark camera, a motor for the automatic intermittent unwinding of the film, wheels for the transmission of movement, one of which is secured at the base of the barrel and is toothed on a part of its periphery only, another toothed wheel gearing with the wheel of the barrel, an axle supporting this second wheel and on which is mounted the winding drum of the wheel in order that said drum should be driven only when the teeth of the wheel of the drum are in gear with the wheel supporting the axle of the drum, a movable rod for stopping the motor, a ball regulator for regulating the movement of the motor, and a shutter for the objective, controlled by the motor.

4. A panoramic photographic apparatus for recording on an endless film, grounds overflown by an aerial machine, comprising a box inclosing a dark camera, an objective at the base of said dark camera, a variable speed motor adjustable at will, wheels for the transmission of movement, a ball regulator, means for intermittently drawing along the film and for causing the taking of the image to correspond to the stopping moment of the film for obtaining a succession of images the edges of which overlap each other so as to obtain a non-interrupted representation of the overflown grounds, and a shutter for the objective.

5. A panoramic photographic apparatus for recording on an endless film, grounds overflown by an aerial machine, comprising a box inclosing a dark camera, an objective at the base of said dark camera, a variable speed motor adjustable at will constituted by a spring barrel, wheels for the transmission of movement, a ball regulator, a device for slowing down at will the speed of the motor, constituted by a bent lever, a plate integral with the regulator and on which presses the lever, a screw for the displacement of the bent lever, a toothed pinion mounted on this screw, wheels for the transmission of movement for actuating an index, a graduated sector arranged behind the index and opposite one of the graduations of which the index is brought by the displacement of the screw, and a shutter for the objective actuated by the motor at the moment the film stops.

6. A panoramic photographic apparatus for recording on a film, grounds overflown by an aerial machine, comprising a box inclosing a dark camera, an objective at the base of said dark camera, a variable speed motor adjustable at will, a movable rod for stopping the motor, a shutter for the objective, constituted by a disk toothed on its periphery, provided with an opening and gearing with a toothed pinion integral with the barrel, a blind hinged on an axis, provided with an opening and drawn back by a spring, a stop for limiting the stroke of the blind, and toothed sectors respectively integral with the disk and with the blind for lifting the latter and releasing it when the opening in the disk is opposite the objective.

7. A panoramic photographic apparatus for recording on a film, grounds overflown by an aerial machine, comprising a box having an opening in its bottom and inclosing a dark camera, an objective at the base of said dark camera opposite the opening of the box, a variable speed motor adjustable at will for the automatic intermittent unwinding of the film, and a shutter for the objective, actuated by the motor at the moment of the stopping of the film.

8. A panoramic photographic apparatus comprising means for moving the film, an objective through which successive portions of the film are exposed, a continuously-rotating disk having an aperture adapted to register with the objective, means for covering the aperture as the same is moving over the objective, and means for quickly removing the last-mentioned means from over the aperture of the disk when the said aperture exactly registers with the objective.

9. A photographic apparatus comprising means for moving the film, an objective through which the film is exposed, a shutter driven by the said means to cover the objective while the film is moving, a device for covering the shutter while the same is moving across the objective, a driving connection whereby the shutter moves the said device until the shutter uncovers the objective, and means for moving the device to uncover the shutter when the latter uncovers the objective.

10. A photographic apparatus comprising an objective, a rotary disk having an aperture adapted to move into and out of registry with the objective, a swinging device adapted to cover the aperture of the shutter as the latter is moving into registry with the objective, gears on the shutter and device for moving the latter by the shutter, and a spring adapted to be placed under tension as the said device is moved with the shutter, and serving to quickly return the device to shutter-uncovering position when the aperture of the shutter registers with the objective.

The foregoing specification of our automatic apparatus for aerial photography, signed by us this twenty-fifth day of October 1912.

AUGUSTE BLAISE BARON.
CHARLES MARIE ARTHUR GUINARD.

Witnesses:
HENRY GUINARD,
LUCIEN MEMMINGER.